UNITED STATES PATENT OFFICE.

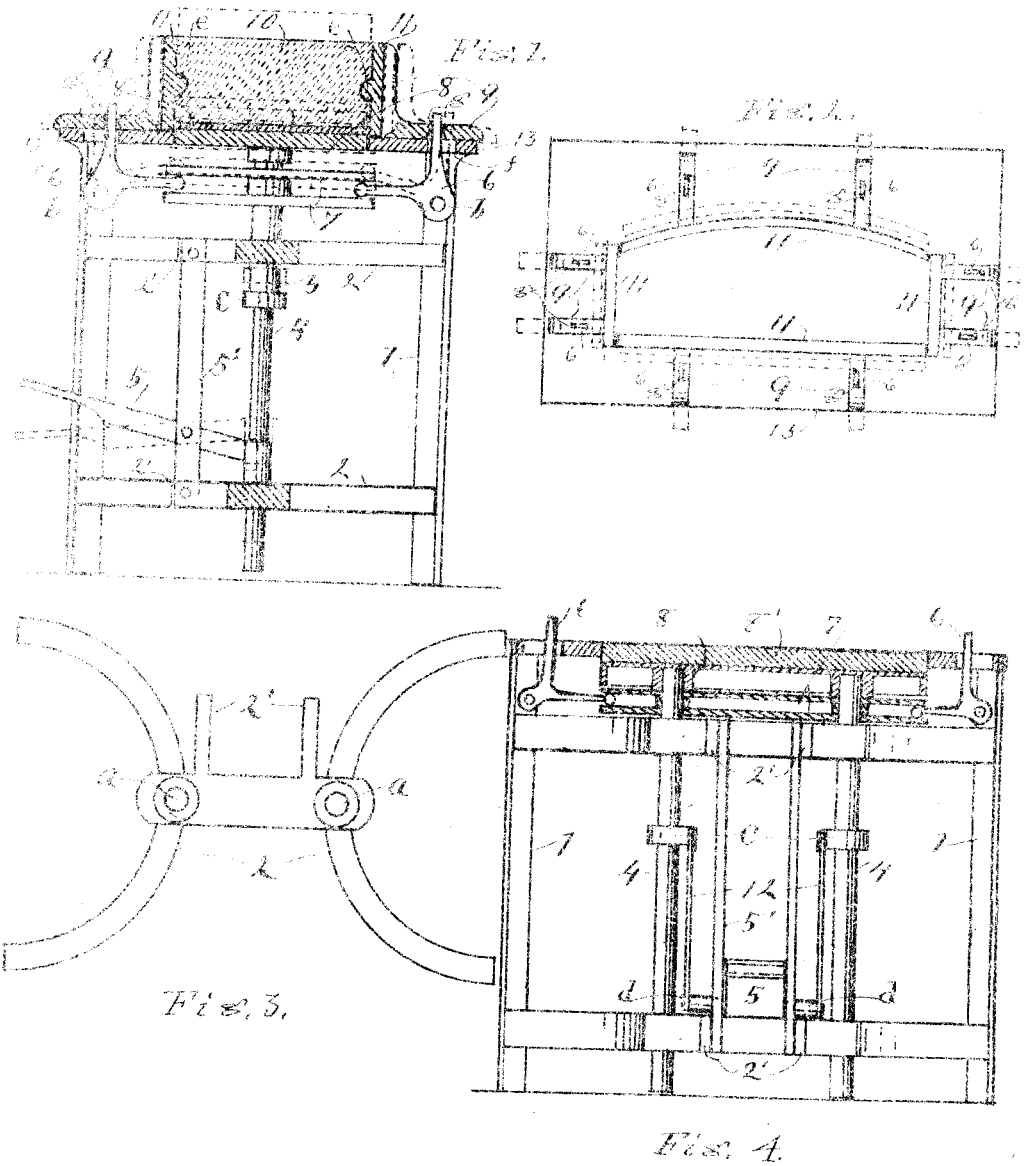

WILLIAM PASSAGE, OF ASHLAND, MICHIGAN, ASSIGNOR OF ONE-HALF TO HERBER CHURCH, OF BAILEY, MICHIGAN.

MOLDING-MACHINE.

1,109,142.  Specification of Letters Patent.  Patented Sept. 1, 1914.

Application filed July 13, 1912. Serial No. 709,278.

*To all whom it may concern:*

Be it known that I, WILLIAM PASSAGE, a citizen of the United States, residing at Ashland, in the county of Newaygo and State of Michigan, have invented certain new and useful Improvements in Molding-Machines, of which the following is a specification.

My invention relates to improvements in machines for molding concrete blocks, and its objects are: first, to provide a molding machine with which the sides and ends of the molds may be readily made to recede from, or to approach the block being molded, or, in other words, may be readily closed to form a close mold for molding the block, or may be made to recede, or open, to facilitate the removal of the block, said action being simultaneous with the raising and lowering of the bottom of the mold. Second, to provide a mold in which the face or weather surface of the blocks may be readily troweled and thereby made impervious to water, while the blocks are still in the molds. Third, to avert the necessity of removing the sides and ends of the mold, or of hinging them to the bed of the machine so as to remove them to facilitate the removal of the completed blocks from the molds. Fourth, to provide a means whereby the movements of the sides and ends of the mold may be readily regulated. Fifth, to provide a means whereby grooves may be made in the edges of the molded blocks for the introduction of cement for firmly cementing the blocks together in wall construction, and, in the manufacture of silo blocks, to provide a receptacle wherein hoops may be placed to hold the construction firmly to place without being placed on the outer surface of the silo where they are exposed to the air, and also, render the surface of the silo unsightly; and, sixth, to provide a means whereby the movable portion of the bed, or the pallet, may be raised and lowered simultaneously with the lateral movements of the sides and ends of the mold. I attain these objects by the mechanism illustrated in the accompanying drawing, in which—

Figure 1 is a sectional elevation of the machine showing the relative positions of the several parts. Fig. 2 is a top plan of the table and mold showing the manner of applying the adjusting brackets. Fig. 3 is a plan of the girt that supports the frame of the machine and acts as guides for the actuating shafts that support and actuate the pallet or mold bed, and, Fig. 4 is a sectional elevation of the mold bed showing the manner of actuating the angle levers that move the sides and ends of the mold.

Similar letters refer to similar parts throughout the several views.

As will be readily understood, my invention lies principally in the construction of the mold, and in the manner of operating its several elements, and in providing a means whereby the weather surface of the blocks may be readily troweled while in the molds; and to these ends the frame 1 is strengthened by the introduction of two girts, 2 2, that have bearing holes *a a* for the reception and free vertical movement of the shafts 4 4 and the sleeves 3, as indicated in Fig. 1. The shafts 4 and sleeves 3 are made to reciprocate vertically by means of a lever or pedal 5 which is pivotally supported on the standards 5′ 5′ and is connected with the shafts 4 4 by means of connecting rods 12, one end of each of which is connected with the pedal 5, as at *d d* and the other end is connected with the shafts 4 4 as at *c c*, so that any vertical movement of the pedal 5 will be communicated to the shafts, and through them to the mold plate and pallet, 8 and 8′ respectively, and at the same time the bearing plates 7 actuate the angle levers 6 6 to draw the brackets *a*, and with them the sides 11 of the mold away from the molded block so that the ribs *e e* will be entirely removed from their corresponding indentures or grooves in the block and the block may be readily removed from the mold.

It is to be understood that the brackets 9 9 are securely attached to the sides and ends, 11, of the mold so that any movement transmitted to the brackets by the angle levers 6 will be equally effective upon the said sides and ends of the mold. The angle levers 6 are pivoted to the frame 1, in convenient and desired position, as at *b b*, and the vertical ends thereof extend upward through the mortises *f* in the frame top 13, and into the mortises *g g* in the brackets, substantially as shown in Fig. 1 and indicated in Figs. 2 and 4. The standards 5′ are supported upon the arms 2′ on the girts 2 in position to give the desired sweep and action to the pedal for moving the several parts of the mold exactly as, when and to the positions desired.

What I claim as new, and desire to secure by Letters Patent of the United States, is:

1. In a molding machine, a supporting frame, a vertically adjustable bottom in said frame, the sides and ends of a mold movably supported on top of the frame, an actuating pedal pivotally connected with the frame, connecting rods connecting one end of the pedal with the vertically movable bed, angle levers pivotally connected with the top of the frame and having the ends so connected with the bottom of the mold and with the sides and ends of the mold that a single movement of the lever will force the bottom of the mold upward and the ends and sides of the mold outward simultaneously, and the weight of the bottom of the mold will force the connected end of the pedal downward and the sides and ends of the mold inward.

2. In combination with the frame, and the vertically movable bottom and horizontally movable sides and ends of a block molding machine, a pedal pivoted to the frame, a connecting rod connecting one end of the pedal with the bottom of the mold, angle levers pivotally connected with the frame and each having one arm connected with the bottom of the mold and the other arm connected with the sides and ends, respectively of the mold, all so arranged that a single movement of the pedal downward will raise the bottom and cause the sides and ends to recede from each other, and a single upward movement of the pedal will cause the bottom to lower and the sides and ends to approach each other simultaneously.

Signed at Grand Rapids Michigan July 1912.

WILLIAM PASSAGE.

In presence of—
I. J. CILLEY,
JOHN W. HILDING.